(12) United States Patent
Mitchell et al.

(10) Patent No.: US 7,596,951 B1
(45) Date of Patent: Oct. 6, 2009

(54) EXHAUST NOZZLE FOR A GAS TURBINE ENGINE

(75) Inventors: Ian A Mitchell, Newport (GB); Michael J Westlake, Gloucestershire (GB)

(73) Assignee: Rolls-Royce plc, London (GB)

( * ) Notice: Subject to any disclaimer, the term of this patent is extended or adjusted under 35 U.S.C. 154(b) by 337 days.

(21) Appl. No.: 11/487,436

(22) Filed: Jul. 17, 2006

(30) Foreign Application Priority Data

Aug. 2, 2005 (GB) ................... 0516043.7

(51) Int. Cl.
  *F02K 1/00* (2006.01)
(52) U.S. Cl. .................... 60/770; 239/265.11
(58) Field of Classification Search ............ 60/770, 60/771; 239/265.19, 265.39, 265.11
  See application file for complete search history.

(56) References Cited

U.S. PATENT DOCUMENTS 3,615,052 A * 10/1971 Tumavicus et al. ..... 239/265.39
5,101,624 A * 4/1992 Nash et al. .................... 60/266
5,437,412 A    8/1995 Carletti
5,593,112 A * 1/1997 Maier et al. .............. 244/117 A
5,833,139 A * 11/1998 Sondee et al. .......... 239/265.17
5,996,936 A * 12/1999 Mueller ..................... 244/53 R
6,070,830 A    6/2000 Mueller et al.

FOREIGN PATENT DOCUMENTS

| EP | 1 507 080 A1 | 2/2005 |
| GB | 2 238 081 A | 5/1991 |
| GB | 2 350 649 A | 12/2000 |

* cited by examiner

*Primary Examiner*—Michael Cuff
*Assistant Examiner*—Phutthiwat Wongwian
(74) *Attorney, Agent, or Firm*—Oliff & Berridge, PLC

(57) ABSTRACT

An exhaust nozzle for a gas turbine engine includes a nozzle casing having top and bottom walls and side walls. A liner is provided within the nozzle casing to define a cooling passage. The top and bottom walls each include mutually inclined planar wall portions which meet at respective creases. The creases increase the rigidity of the top and bottom walls. In addition, the inclined wall portions cause the cooling passage to taper in the direction outwardly from the creases, so assisting in the cooling air distribution over the liner.

10 Claims, 2 Drawing Sheets

-- PRIOR ART --

EXHAUST NOZZLE FOR A GAS TURBINE ENGINE

This invention relates to an exhaust nozzle for a gas turbine engine and is particularly, although not exclusively, concerned with such an exhaust duct for use in circumstances in which a reduced IR (infra-red) and RCS (Radar Cross Section) signature is desirable.

BACKGROUND

It is known to take various measures to reduce the IR and RCS signatures of 'stealth' aircraft such as UCAVs (Unmanned Combat Air Vehicles). The engine exhaust of such aircraft is a significant contributor to the IR signature, and it is known to take measures to reduce the temperatures of both the exhaust gases issuing from the exhaust nozzle and of the aircraft components surrounding the exhaust nozzle. This has been achieved in the past by constructing the exhaust nozzle as a twin-walled structure, so that cooling air can flow between the walls, to emerge into the exhaust gas flow through effusion cooling holes in the inner wall. The inner wall has been constructed as a liner made up of a plurality of tiles supported from the outer wall or nozzle casing of the engine.

In a previous proposal, the nozzle casing of an exhaust nozzle for a UCAV has a generally trapezoidal flow cross-section defined by top and bottom walls and a pair of side walls which interconnect the top and bottom walls. The side walls are relatively short in the flow direction, and the top and bottom walls have V-shaped profiles projecting beyond the side walls in the downstream direction (with respect to gas the direction of flow through the nozzle).

The liner in the previous proposal is at generally the same distance from the nozzle casing around the circumference of the nozzle. Consequently, as seen in cross-section, the flow passage for the cooling air has a constant width around the exhaust nozzle.

The nozzle casing needs to be very stiff, particularly at the nozzle exit, in order to maintain its alignment with the airframe in which it is installed, and to avoid excessive loads on the liner. The nozzle casing needs to be sufficiently stiff to resist pressure loads which tend to deform it outwardly, to assume an oval cross-section. Furthermore, the cooling air pressure tends to deflect the overhanging downstream end portions of the top and bottom wall portions in the direction away from the exhaust centreline, while the same cooling air pressure tends to deform the liner in the direction towards the exhaust centreline. The result of these effects is to widen the gap between the nozzle body and the liner, particularly in the downstream end regions, and this can increase the RCS signature and can also allow the uncontrolled escape of cooling air from the cooling passage. Distortion of the nozzle casing upsets the aerodynamics of the exhaust nozzle, affecting the distribution of cooling air over the liner and into the exhaust gas flow.

In order to achieve adequate stiffness in the nozzle casing of the previous proposal, the nozzle casing has a substantial thickness, and is consequently heavy.

SUMMARY

If the width of the cooling passage is determined so as to provide an adequate flow rate of air in the region of greatest requirement, i.e. at the central regions of the top and bottom wall portions, where the length in the exhaust gas flow direction is greatest, then this width will be larger than necessary in the regions where there is a lower flow requirement, for example at the side walls.

According to the present invention there is provided an exhaust nozzle for a gas turbine engine, the exhaust nozzle comprising a nozzle casing having top and bottom walls and side walls which interconnect the top and bottom walls, characterised in that at least one of the top and bottom walls comprises at least two mutually inclined planar wall portions which meet each other at a crease extending parallel to the flow direction through the exhaust nozzle, and a liner (4) disposed within the nozzle casing (2) to provide a cooling passage (18) between the nozzle casing (2) and the liner (4), the liner (4) being planar over the extent of the respective top or bottom wall (6, 8).

The exhaust nozzle includes a liner spaced from the nozzle casing to define a cooling passage, the liner preferably being provided with effusion holes to enable air flowing in the cooling passage to pass into exhaust gas flowing through the exhaust nozzle. Preferably, the width of the cooling passage is smaller at the side walls than adjacent the crease in the top and/or bottom wall. The liner is generally planar across the extent of the respective top or bottom wall.

The planar wall portions are preferably inclined at an angle close to, but less than, 180°. In a preferred embodiment, wall portions are inclined at an angle of not less than 160°, and more preferably at an angle of not less than 172°. The angle between the planar wall portions preferably opens inwardly of the exhaust nozzle.

The planar wall portions preferably extend from the crease to the respective side walls, and consequently together constitute the entire top or bottom wall. Preferably, both the top and bottom walls comprise two mutually inclined planar wall portions meeting at a crease.

The trailing edge of each of the top and bottom walls preferably comprises two edge portions disposed in the form of a V, each edge portion extending obliquely inwardly with respect to the exhaust nozzle centreline, and downstream with respect to the exhaust gas flow direction, from the respective side wall to an apex lying on the crease.

BRIEF DESCRIPTION OF THE DRAWINGS

For a better understanding of the present invention and to show more clearly how it may be carried into effect, reference will now be made, by way of example, to the accompanying drawings, in which.

DETAILED DESCRIPTION

Figure 1:
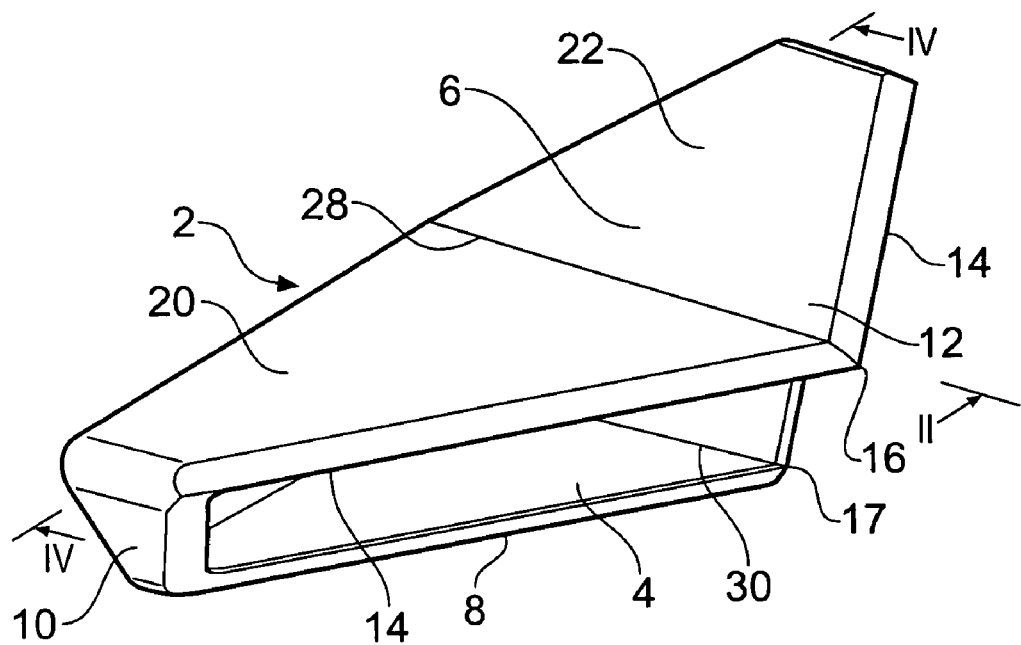
FIG. 1 is a perspective view of an exhaust nozzle in accordance with the present invention.
Figure 2:
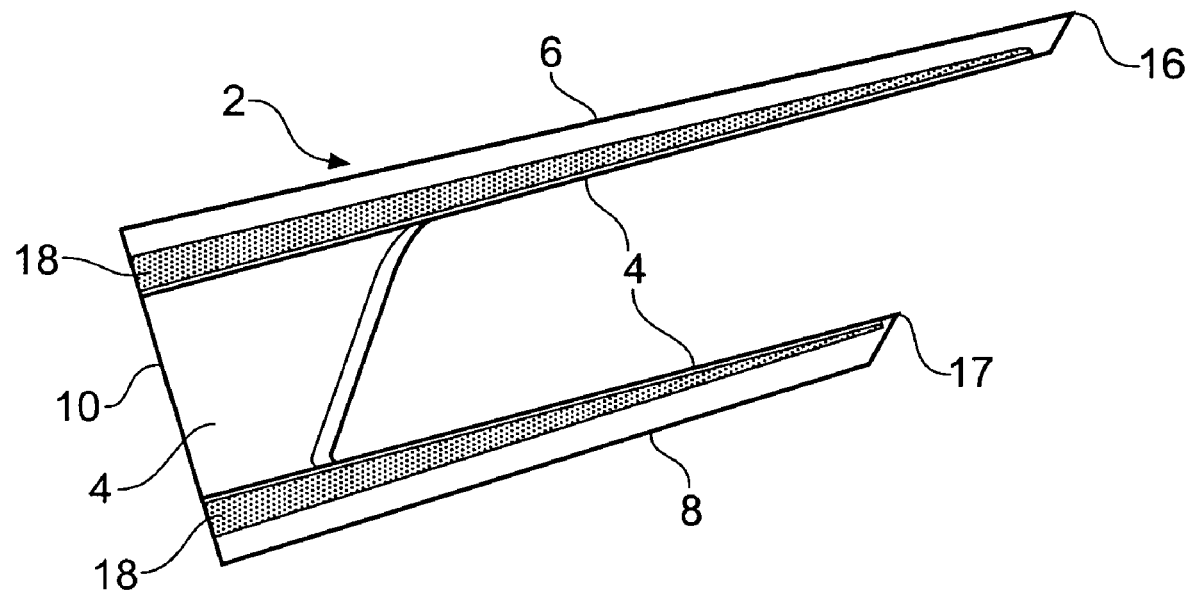
FIG. 2 is a cross-section taken on the line II-II in FIG. 1.
Figure 4:
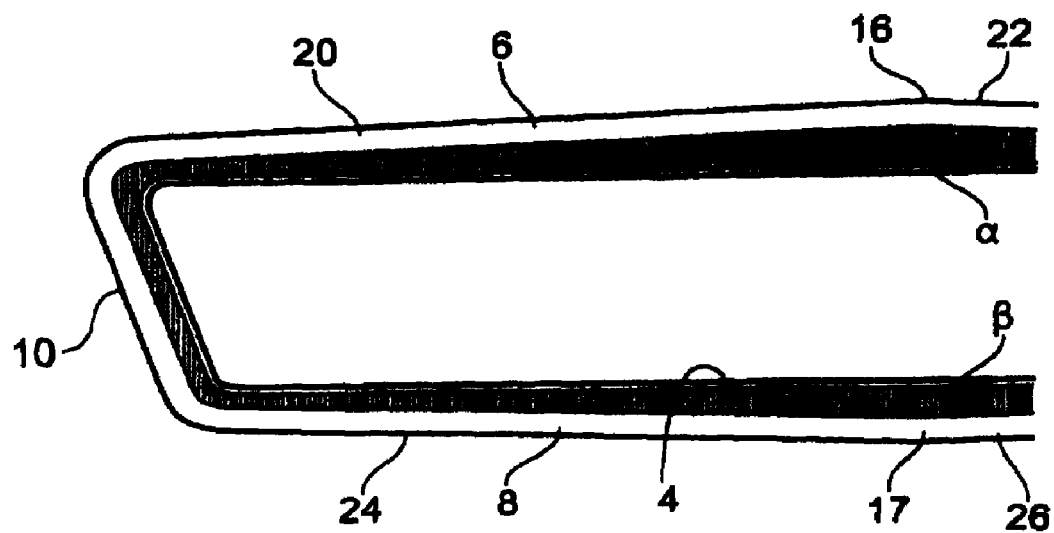
FIG. 4 is a cross-section taken on the line IV-IV, showing the exhaust nozzle in accordance with the present invention.

The exhaust nozzle shown in FIGS. 1, 2 and 4 comprises a nozzle casing 2 to which is secured a liner 4. The liner 4 may, for example, be made up of a plurality of individual tiles supported independently by the nozzle casing 2.

The nozzle casing 2 comprises a top wall 6, a bottom wall 8 and a pair of side walls 10 which interconnect the top and bottom walls 6, 8 and which slope inwardly from top to bottom so that the exhaust nozzle overall has a generally trapezoidal cross-section. References in this specification implying upwards and downwards directions relate to the orientation of the exhaust nozzle when installed in an aircraft in level flight.

The top and bottom walls 6, 8 extend beyond the side walls 10 in the downstream direction, with respect to the direction of gas flow through the exhaust nozzle. Thus, the top wall 6 has a projecting or overhanging region 12 constituted by two oblique edges 14 which meet at an apex 16 so that the trailing edge of the top wall 6 has a shallow V-shaped configuration. The trailing edge adjacent the edges 14 is scarfed so that the exhaust nozzle can be integrated with the airframe in which it is installed. The bottom wall 8 has a similar shallow V-shaped configuration at its trailing edge terminate at an apex 17, although, as is clear from FIG. 2, the top wall 6 projects further in the downstream direction than the bottom wall 8.

The nozzle casing 2 and the liner 4 define between them a cooling passage 18. The cooling passage 18 receives cooling air, for example from the engine bypass, at its upstream end, and this cooling air flows through the cooling passage 18 to emerge from effusion holes (not shown) which allow the air to pass through the liner 4 into the stream of exhaust gas passing through the exhaust nozzle. The loss of air from the cooling passage 18 to the exhaust gas flow reduces the volume flow rate in the downstream direction, and consequently the cooling passage 18 is tapered as shown in FIG. 2.

Figure 3:
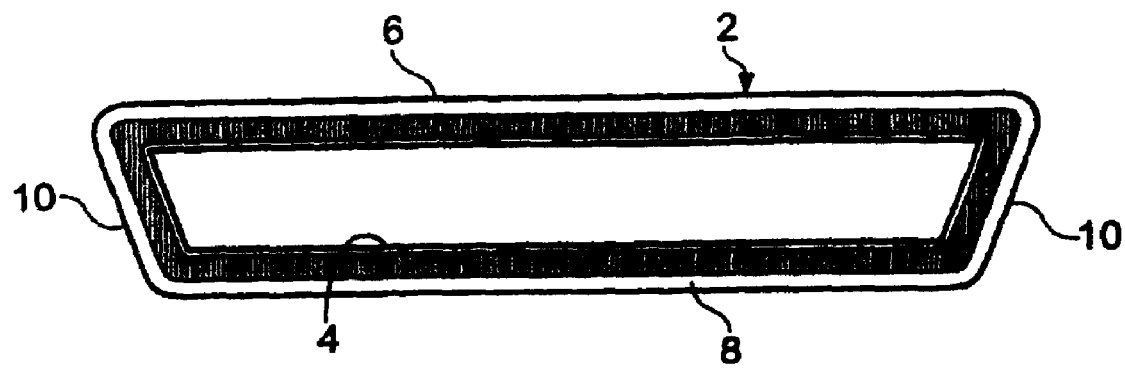
FIG. 3 (PRIOR ART) is a cross-section corresponding to the line IV-IV in FIG. 1 but showing an exhaust nozzle in accordance with a previous proposal.

In accordance with a previous proposal, shown in FIG. 3, the top and bottom walls 6, 8 of the nozzle casing 2 are substantially planar, or flat, over their full extent, and the liner 4 is positioned within the nozzle casing 2 so that, as seen in transverse cross-section, the cooling passage 18 has a generally constant width around the nozzle. However, in accordance with the present invention, as shown in FIGS. 1 and 4, the top and bottom walls 6, 8 are non-planar. Thus, the top wall 6 comprises two planar wall portions 20, 22 which are inclined to one another at an angle α which is close to, but less than 180°. In the illustrated embodiment, the angle α is 176°, but other angles of inclination are possible. Similarly, the bottom wall 8 comprises two planar wall portions 24, 26 which are inclined to each other at an angle β which, in the embodiment shown, is 177° although, again, different angles of inclination are possible.

The wall portions 20, 22 and 24, 26 meet one another at respective creases 28, 30 which, as can be appreciated from FIG. 1, extend over the full length of the respective top and bottom walls 6, 8. The apices 16, 17 of the downstream edges of the top and bottom walls 6, 8 lie on the creases 28, 30 respectively.

The creases 28, 30 significantly increase the rigidity of the top and bottom walls 6, 8, and so enhance the ability of the top and bottom walls 6, 8 to resist deflection away from the centre line of the exhaust nozzle under the pressure loading applied by the cooling air in the cooling passage 18.

Furthermore, as is apparent from FIG. 4, the inclination of the wall portions 20, 22 and 24, 26 means that, for the same profile of the liner 4, the cooling passage 18 tapers, as seen in transverse cross-section, from the crease 28, 30 towards the side walls 10. Furthermore, the side walls 10 can be displaced inwardly (by comparison with the prior proposal of FIG. 3) to reduce the width of the cooling passage 18 even further). The result of the varying width of the cooling passage 18 is that regions of the cooling passage 18 which supply a relatively large area of the liner 4, and consequently a relatively large number of effusion holes, can be provided with a relatively large cooling air flow cross-section. Such areas are those adjacent to the creases 28, 30, where the length of the liner 4 in the gas flow direction is greatest.

By contrast, regions of the cooling passage 18 which supply air to smaller areas of the liner 4, such as the region adjacent side walls 10 and the outer regions of the top and bottom walls 6, 8, have smaller flow cross-sections.

Consequently, by appropriately inclining the top and bottom wall portions 20, 22 and 24, 26, the distribution of cooling air around the liner 4 can be made more consistent, while at the same time increasing the stiffness of the nozzle casing 2. Although FIG. 4 shows angles α and β in excess of 175°, smaller angles may be appropriate in some circumstances, depending on the degree of stiffness required and on the desired distribution of cooling air.

The increased stiffness of the top and bottom walls 6, 8 afforded by the creases 28; 30 provides better control of the movements of the nozzle casing 2 and of the liner 4 under both pressure and thermal loading, particularly at the nozzle exit apices 16 and 17.

Because the cooling passage 18 can be reduced in width in the region of the side walls 10, the overall size of the nozzle may be reduced by comparison with the embodiments shown in FIG. 3, so making it easier to integrate the exhaust nozzle into the airframe. Also, the stiffness achieved by the creases 28, 30 allows the thickness, and therefore weight and cost, of the nozzle casing, to be reduced.

Although the invention has been described in the context of an exhaust nozzle including the liner 4, it may also be applied to nozzles without liners. Also, although only a single central crease 28, 30 has been shown in each top and bottom wall 6, 8, more than one crease, consequently more than one planar wall panel, may be provided.

The invention claimed is:

1. An exhaust nozzle for a gas turbine engine, the exhaust nozzle comprising:
 a four-walled nozzle casing having a top and a bottom wall and two side walls that interconnect the top and the bottom walls,
 wherein at least one of the top and the bottom walls comprises at least two mutually inclined planar wall portions, the mutually inclined planar wall portions meeting each other at a crease extending parallel to a flow direction through the exhaust nozzle, and
 a four-walled liner disposed within the nozzle casing providing a cooling passage between the nozzle casing and the liner, the liner being planar over the extent of the respective top or bottom wall, and
 wherein the cooling passage is a continuous channel being formed around a circumference of the nozzle casing between the nozzle casing and the liner.

2. The exhaust nozzle according to claim 1, wherein the liner is provided with effusion holes for the passage of air from the cooling passage to the exhaust gas flowing in the exhaust nozzle.

3. The exhaust nozzle according to claim 1, wherein, as viewed in transverse cross-section, the cooling passage tapers from the crease to the side walls and the cooling passage having a thickest portion at the crease.

4. The exhaust nozzle according to claim 1, wherein the mutually inclined planar wall portions are inclined to each other at an angle (α, β) which is less than 180° but not less than 160°.

5. The exhaust nozzle according to claim 4, wherein the mutually inclined planar wall portions are inclined to each other at an angle (α, β) which is not less than 172°.

6. The exhaust nozzle according to claim 1, wherein the mutually inclined planar wall portions meet each other at an angle that opens inwardly of the nozzle.

7. The exhaust nozzle according to claim 1, wherein the mutually inclined planar wall portions each extend from the crease to a respective side wall.

8. The exhaust nozzle according to claim 1, wherein both of the top and the bottom walls comprise two respective mutually inclined planar wall portions.

9. The exhaust nozzle according to claim 1, wherein a downstream edge of each of the top and bottom walls comprises two edge portions disposed in the form of a V, each edge portion extending obliquely inwardly and downstream from the respective side wall to an apex lying on the crease.

10. An exhaust nozzle for a gas turbine engine, the exhaust nozzle comprising:
- a nozzle casing having a top and a bottom wall and side walls that interconnect the top and the bottom walls, wherein at least one of the top and the bottom walls comprises at least two mutually inclined planar wall portions, the mutually inclined planar wall portions meeting each other at a crease extending parallel to a flow direction through the exhaust nozzle, and
- a liner disposed within the nozzle casing providing a cooling passage between the nozzle casing and the liner, the liner being planar over the extent of the respective top or bottom wall, and
- wherein the cooling passage is a continuous channel being formed around a circumference of the nozzle casing between the nozzle casing and the liner, and
- wherein, as viewed in transverse cross-section, the cooling passage tapers from the crease to the side walls and the cooling passage has a thickest portion at the crease.

* * * * *